(12) United States Patent
Kita

(10) Patent No.: US 7,327,877 B2
(45) Date of Patent: Feb. 5, 2008

(54) IMAGE PROCESSING APPARATUS AND IMAGE PROCESSING METHOD

(75) Inventor: Koji Kita, Wakayama-ken (JP)

(73) Assignee: Noritsu Koki Co., Ltd., Wakayama-Shi (JP)

( * ) Notice: Subject to any disclaimer, the term of this patent is extended or adjusted under 35 U.S.C. 154(b) by 687 days.

(21) Appl. No.: 10/928,827

(22) Filed: Aug. 27, 2004

(65) Prior Publication Data

US 2005/0047658 A1    Mar. 3, 2005

(30) Foreign Application Priority Data

Aug. 29, 2003    (JP) ............................ 2003-307207

(51) Int. Cl.
*G06K 9/00* (2006.01)

(52) U.S. Cl. .................................... 382/167

(58) Field of Classification Search ................ 382/167, 382/260, 275
See application file for complete search history.

(56) References Cited

U.S. PATENT DOCUMENTS

| | | | |
|---|---|---|---|
| 5,266,805 A | | 11/1993 | Edgar |
| 6,133,953 A | * | 10/2000 | Okada ........................ 348/272 |
| 2002/0131649 A1 | | 9/2002 | Yamaguchi |
| 2003/0002747 A1 | | 1/2003 | Zaklika et al. |

2003/0127597 A1    7/2003  Nakamura et al.

FOREIGN PATENT DOCUMENTS

| | | |
|---|---|---|
| EP | 1 289 309 A | 3/2003 |
| JP | 11-98370 | 4/1999 |
| JP | 2000-341473 | 12/2000 |
| JP | 2000-349968 | 12/2000 |
| JP | 2001-078038 | 3/2001 |
| WO | WO-01/20898 A1 | 3/2001 |
| WO | WO-01/27688 A2 | 4/2001 |

* cited by examiner

*Primary Examiner*—Phuoc Tran
(74) *Attorney, Agent, or Firm*—Fulbright & Jaworski LLP

(57) ABSTRACT

An image processing method correcting a defective portion in color image data having a plurality of color components. The method includes the steps of adjusting luminance of each defective pixel; selecting a plurality of normal pixels from around a target pixel which is selected from a plurality of defective pixels; obtaining for each color component, a difference between a pixel value of the target pixel whose luminance has been adjusted by the luminance adjusting unit and a corresponding pixel value of each normal pixel selected; obtaining a minimum value of the differences for the respective color components of each normal pixel, thereby to obtain a weight coefficient common to the respective color components for each normal pixel, the smaller the minimum value, the greater a weight being provided by the coefficient; calculating a weighted average value for each color component of the plurality of normal pixels by using the weight coefficient; and correcting the target pixel by using the weighted average value for each color component.

5 Claims, 5 Drawing Sheets

---------- target pixel

---------- defective pixel

---------- normal pixel

IMAGE PROCESSING APPARATUS AND IMAGE PROCESSING METHOD

RELATED APPLICATION

Applicant hereby claims priority to Japanese Patent Application No. 2003-307207, filed on Aug. 29, 2003.

BACKGROUND OF THE INVENTION

1. Field of the Invention

The present invention relates to an image processing technique for correcting a defective portion in color image data having a plurality of color components. In particular, the invention relates to an image processing technique for effecting an interpolating operation which allows appropriate correction or "retouching" of the image data even when a boundary (edge) or pattern portion of a photographically recorded image is present within its defective portion, by appropriately reflecting such boundary, pattern or the like in the correction.

2. Description of the Related Art

A photographic film may include a defective portion on its surface, such as a scar, dust, dirt, etc. Then, when a photographically recorded image is read from such "defective" film to be printed on a print sheet or outputted on a display, there is known a technique available for correcting such defect by means of an image processing operation relying on e.g. a luminance adjustment technique and an interpolating technique.

An exemplary technique is known from Japanese Patent Application "Kokai" No.: 11-98370 (at pages 15-16, FIG. 4 thereof in particular). This technique effects correction by way of luminance adjustment, based on the unique property of infrared beam. Namely, unlike the visible beam, the infrared beam, when irradiated on an exposed photographic film, is hardly affected by a photographic image recorded thereon, but affected only by such physical defect as a scar, dust or the like. Referring more particularly to this technique, both infrared beam and visible beam are irradiated on an exposed photographic film. Then, a portion of the film where a pixel value of infrared image data is below a predetermined threshold is determined as a defective portion. Then, to a pixel value of each color component (red (R), green (G), blue (B)) of this defective portion, a correction value is added as a "gain" which corresponds to an amount of luminance attenuation occurring in the defective portion relative to a normal (non-defective) portion of the film, thereby to positively increase the luminance. In this way, the pixel value of each color component of the defective portion is adjusted or corrected relative to the normal portion by means of luminance enhancement.

However, this luminance adjustment technique is based on an assumption that the pixel values of the respective color components of the defective portion have experienced an equal amount of luminance attenuation. For this reason, if the amounts of attenuation in the pixel values of the respective color components differ from each other as may happen in the case of a scar in an emulsion surface on the film, the above technique cannot correct this defect appropriately.

In such case, an interpolation technique may be employed which corrects the defective portion by utilizing pixel values of non-defective pixels adjacent thereto as reference values for the defect correction. However, if the defective portion includes a boundary (edge) or a pattern of the photographic image recorded on the film, such defective portion cannot be properly corrected by the above technique if it simply applies pixel values of adjacent non-defective pixels to the defective portion for its correction. In an attempt to cope with this problem, there has been proposed a further technique known from e.g. Japanese Patent Application "Kokai" No. 2001-78038 (in particular, at pages 7-8, FIGS. 4-5 and FIG. 8), which corrects such defective portion with consideration to the pattern, the edge or the like of the photographic image which may be included therein. According to this technique, the direction of the image boundary or the like is detected first and then pixel values of non-defective pixels which are present along this detected direction of the boundary are applied to the defective portion, whereby the deflective portion may be corrected appropriately with consideration to the image pattern, boundary or the like. More particularly, along a plurality of differing directions from the defective portion, the technique calculates image "attribute" values such as a difference between pixel values of adjacent non-defective pixels, a distance between the adjacent non-defective pixels, etc. Then, based on the pixel values of the normal pixels present along the plural directions, an interpolation value is obtained for each of the plural directions. Thereafter, the technique proceeds to obtain a weighted average value of the interpolation values for each direction, with using the above-described image attribute values as the "weight" therefor and uses this value as a final corrected value for the interpolation.

Yet, this conventional interpolation correction technique exemplified by the Japanese Patent Application "Kokai" No. 2001-78038 discussed above still suffers a problem as follows. Namely, in this conventional technique, the calculations of the image attribute values and the interpolation values are effected along a plurality of different radial directions from the defective portion as their common center. For this reason, when no image boundary or pattern is present around the defective portion or such image boundary or pattern is present along the radial direction, the technique can correct the defect with accuracy. On the other hand, if a complicated image boundary or pattern is present within the defective portion, such defective portion cannot be corrected properly by the above technique which effects the interpolation by using pixel values of normal pixels present along the radial directions. Especially, appropriate correction becomes even more difficult in case the defective portion is large in its area since the possibility of presence of complicated image boundary or pattern is higher in such large area.

The above technique suffers another problem. Namely, for the detection of direction of the image boundary or pattern, the technique requires calculations of the image attribute values and interpolation values to be effected radially omni-directionally around the defective portion. Especially, for accurate detection of image boundary or pattern direction, it is needed to decrease or minimize the angular space between adjacent radial directions. Hence, the technique requires a great amount of calculation for the calculations of the image attribute values and interpolation values. Accordingly, it is difficult for this technique to increase its processing speed.

SUMMARY OF THE INVENTION

In view of the above-described state of the art, a primary object of the present invention is to provide an image processing apparatus which is capable of effecting accurate correction of a defective portion by the interpolation technique even when this defective portion contains a complicated image boundary or pattern therein and which is capable also of increasing the processing speed with restricting the amount of calculation needed for the correction.

For accomplishing the above-noted object, according to the present invention, in an image processing apparatus for correcting a defective portion in color image data having a plurality of color components, the apparatus comprises:

a luminance adjusting unit for adjusting luminance of each defective pixel;

a normal pixel selecting unit for selecting a plurality of normal (non-defective) pixels from around a target pixel (a pixel of interest) which is selected from a plurality of defective pixels;

a weight coefficient calculating unit configured for obtaining for each color component, a difference between a pixel value of the target pixel whose luminance has been adjusted by the luminance adjusting unit and a corresponding pixel value of each normal pixel selected by the normal pixel selecting unit and subsequently using a minimum value of said differences for the respective color components of each normal pixel, thereby to obtain a weight coefficient common to the respective color components for said each normal pixel, the smaller the minimum value, the greater a weight being provided by said coefficient;

an average value calculating unit configured for calculating a weighted average value for each color component of the plurality of normal pixels by using said weight coefficient calculated by said weight coefficient calculating unit; and a correcting unit for correcting the target pixel by using said weighted average value for each color component calculated by said weighted-average calculating unit.

With the above-described construction, in general, when the defect is present in the form of a scar, dust or dirt on the base surface of the photographic film, this will result in an equal amount of attenuation in the pixel values of the respective color components of a defective pixel included in image data read from the film. Therefore, in this case, appropriate correction of the defect is possible by the luminance adjustment technique described above. On the other hand, when a scar or damage is present in the emulsion surface or layer(s) on the photographic film, it is likely that this scar or damage is present only in a particular emulsion layer(s) of certain color component(s). In this case, the amounts of attenuation occurring in the pixel values for the respective color components will differ from each other. Hence, the luminance adjustment technique for uniformly varying the pixel values of the respective color components all together cannot correct this defect appropriately. For its appropriate correction, the interpolation technique is required. Incidentally, even in the case of such scar or the like being present in the emulsion surface of an exposed photographic film, it is very rare for the scar or the like to be formed so deeply as to damage all color component emulsion layers of the film. Therefore, after the uniform luminance adjustment on a defective pixel included in image data read from a photographic film having a scar in its emulsion surface, pixel value(s) for one or two non-damaged color components has been corrected almost to that of a normal pixel. That is to say, even when a defective pixel in image data has resulted from a scar in the emulsion surface, pixel values for the non-damaged one or two color components thereof can be corrected substantially to the counterpart normal value(s) of the normal pixel corresponding thereto by means of the luminance adjustment technique. Therefore, between pixel values of respective color components of a defective pixel after the luminance adjustment and pixel values of the respective color components of certain number of normal pixels adjacent thereto, there is a tendency of significant similarity therebetween for one or two color components.

Then, according to the construction of the present invention, the pixel value for each color component of the target pixel after the luminance adjustment is compared with a pixel value of each corresponding color component of normal pixels adjacent thereto and the correction value for the target pixel is calculated in such a manner that this value is affected more by a normal pixel having similar pixel value(s) for one or two color components than other "non-similar" normal pixels. Hence, the interpolation is effected by using, in the corrected pixel value, a greater portion of the pixel value of the normal pixel which is more similar to the non-defective condition of the target pixel. As a result, the defective pixel can be restored to its non-defective state with greater accuracy. Therefore, even when the defective portion contains a complicated image boundary, pattern etc., accurate correction thereof is made possible, with such boundary or pattern being reflected therein. Further, for the correction of the target pixel, this requires only that the normal pixels selected by the normal pixel selecting unit include as few as 1 to 3 normal pixels which are similar to the non-defective counterpart of the target defective pixel. Thus, accurate correction is possible with a small number of normal pixels as few as e.g. 5 to 10, selected by the normal pixel selecting unit for subsequent calculation. Therefore, the technique proposed by the present invention allows reduction of the required amount of calculation, thus allowing increase in its calculation processing speed. Incidentally, if there is a sufficient margin in the processing speed capacity allowed by the particular apparatus configuration employed, the number of normal pixels to be selected by the normal pixel selecting unit may be increased in order to achieve greater correction accuracy by searching such normal pixels similar to the non-defective condition of the target pixel with greater reliability or by searching a greater number of such normal pixels.

According to one preferred embodiment of the present invention, said normal pixel selecting unit effects the search for normal pixels while progressively extending its search area outward from the vicinity of the target pixel, until a predetermined amount of normal pixels is detected. In this respect, it should be noted that the "predetermined amount" relating to the detection of the normal pixels is not limited to a simple number of units (10 units e.g.) of normal pixels to be detected, but may be e.g. an amount of normal pixel(s) where a sum of weight coefficients calculated by the weight coefficient calculating unit has a predetermined desired value (hence, in this case, the actual (unit) number of normal pixels to be detected will vary in accordance with a pixel value of the normal pixel to be detected).

According to the above-described embodiment, normal pixels closer to the target pixel are positively selected. Hence, pixel values of those normal pixels away from the target pixel are not used or positively excluded for correction of the target pixel. Further, since the search for normal pixels is stopped upon detection of a predetermined amount thereof, the number of pixels used for the calculation can be restricted advantageously thus allowing increased calculation processing speed.

According to a further embodiment of the present invention, the apparatus further comprises an adjustment coefficient calculating unit for obtaining, for each of the normal pixels selected by the normal pixel selecting unit, a difference between a pixel value thereof for each color component and the counterpart pixel value of the target pixel obtained after the luminance adjustment by the luminance adjusting unit, then obtaining a maximum value and a minimum value respectively from said differences obtained for the normal pixel for the respective color components, and subsequently obtaining an adjustment coefficient by using a difference between said maximum value and said minimum value, wherein said correcting unit corrects the target pixel by applying said weighted average value for each color component calculated by said weighted-average calculating unit to the counterpart pixel value of the target pixel after the luminance adjustment by a ratio corresponding to said adjustment coefficient calculated by said adjustment-coefficient calculating unit.

In the case of the above-described embodiment, for each color component, differences between pixel values of the plurality of normal pixels around the target pixel and pixel values of the target pixel after the luminance adjustment are obtained. Then, based on a magnitude of a difference between a maximum value and a minimum value of said differences for the respective color components of the respective normal pixels, possibility of the defect of the target pixel being attributable to a scar in the emulsion surface is evaluated (or deduced) and the resultant evaluation is expressed as an adjustment coefficient. Then, if the evaluated possibility of the defect being attributable to a scar in emulsion surface is high, the application ratio for the interpolation to the target pixel is positively increased, while the application ratio for the luminance adjustment thereto is decreased correspondingly. On the other hand, if the evaluated possibility of the defect being attributable to a scar in emulsion surface is low, the application ratio for the luminance adjustment is positively increased while that for the interpolation is decreased correspondingly. In this way, the correction for the target pixel can utilize a "best mix" of the luminance adjustment technique and the interpolation technique, for optimal correction of the target pixel accurately reflecting the actual type of its defect. Further, even when the evaluated possibility of the defect being attributable to a scar in emulsion surface is neither high nor low, but intermediate, the application ratio between the interpolation and luminance adjustment is optimally controlled, based on such evaluated possibility. As a result, in the finished photographic print, the border between adjacent image portions subjected to different types of correction technique will not appear so conspicuously as in the case with a technique which selectively employs only one of the interpolation and luminance adjustment technique. Hence, the corrected photographic image will not present unnatural appearance.

For accomplishing the object described hereinbefore, according to a further aspect of the present invention, there is proposed an image processing method for correcting a defective portion in color image data having a plurality of color components, the method comprising the steps of adjusting luminance of each defective pixel;

selecting a plurality of normal (non-defective) pixels from around a target pixel (a pixel of interest) which is selected from a plurality of defective pixels;

obtaining for each color component, a difference between a pixel value of the target pixel whose luminance has been adjusted by the luminance adjusting step and a corresponding pixel value of each normal pixel selected by the normal pixel selecting unit;

obtaining a minimum value of said differences for the respective color components of each normal pixel, thereby to obtain a weight coefficient common to the respective color components for said each normal pixel, the smaller the minimum value, the greater a weight being provided by said coefficient;

calculating a weighted average value for each color component of the plurality of normal pixels by using said weight coefficient; and correcting the target pixel by using said weighted average value for each color component.

With the above method proposed by the present invention, the same functions and effects described in connection with the image processing apparatus described hereinbefore can be achieved. Namely, even when a defective portion includes a complicated image boundary (edge) or pattern therein, the method allows accurate correction of such defective portion with reflection of such boundary, pattern or the like therein. The method allows also advantageous reduction in the amount of calculations needed, thereby to increase the calculation processing speed.

The present invention may be applied to a program configured for executing the above-described image processing method and also to a storage medium storing such program therein.

Further, other features and advantages of the invention will become apparent upon reading following detailed description of preferred embodiments thereof with reference to the accompanying drawings.

DESCRIPTION OF THE PREFERRED EMBODIMENTS

Figure 1:
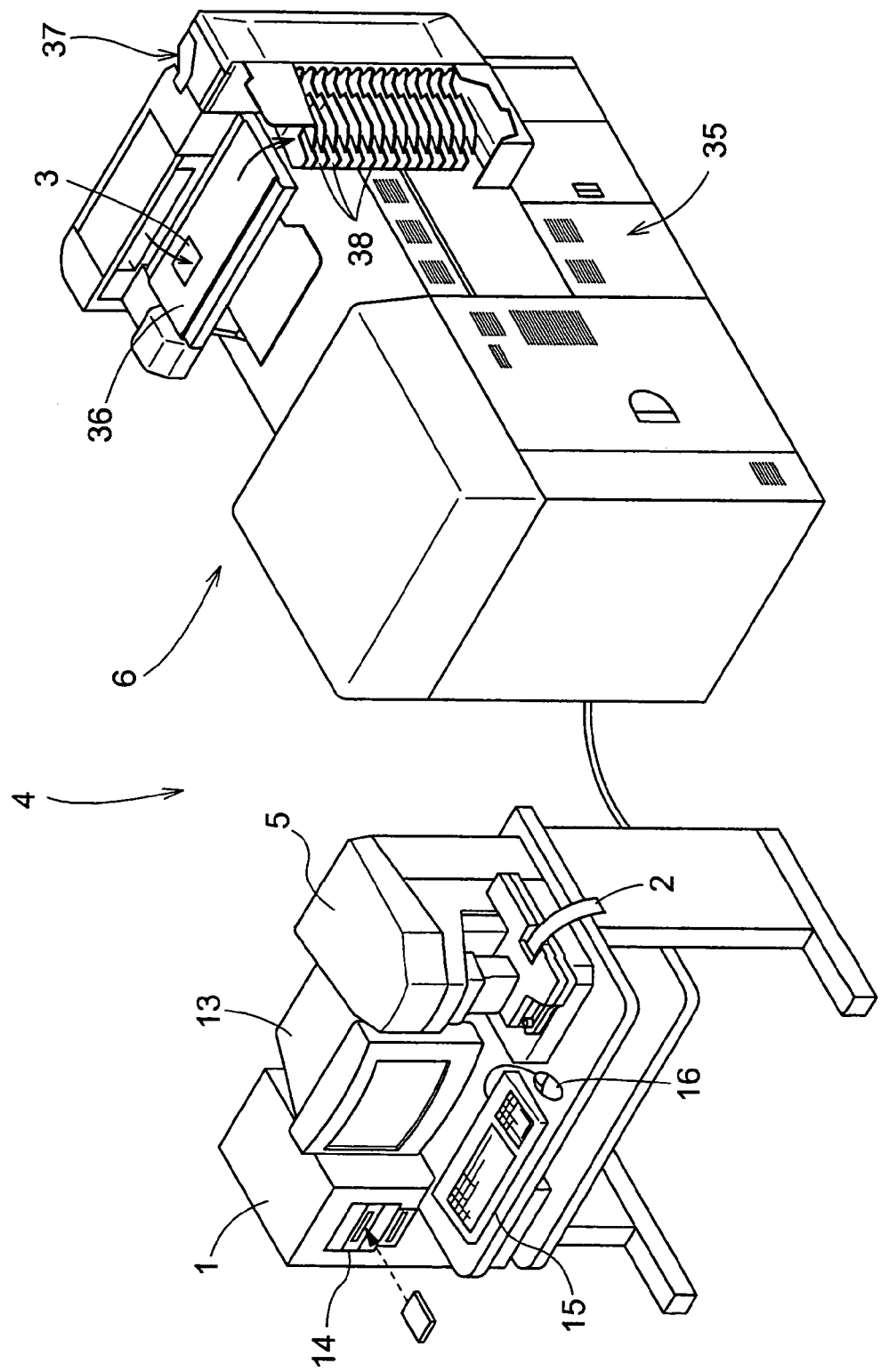
FIG. 1 is a perspective view showing an appearance of an image printing system relating to a preferred embodiment of the invention.
Figure 2:
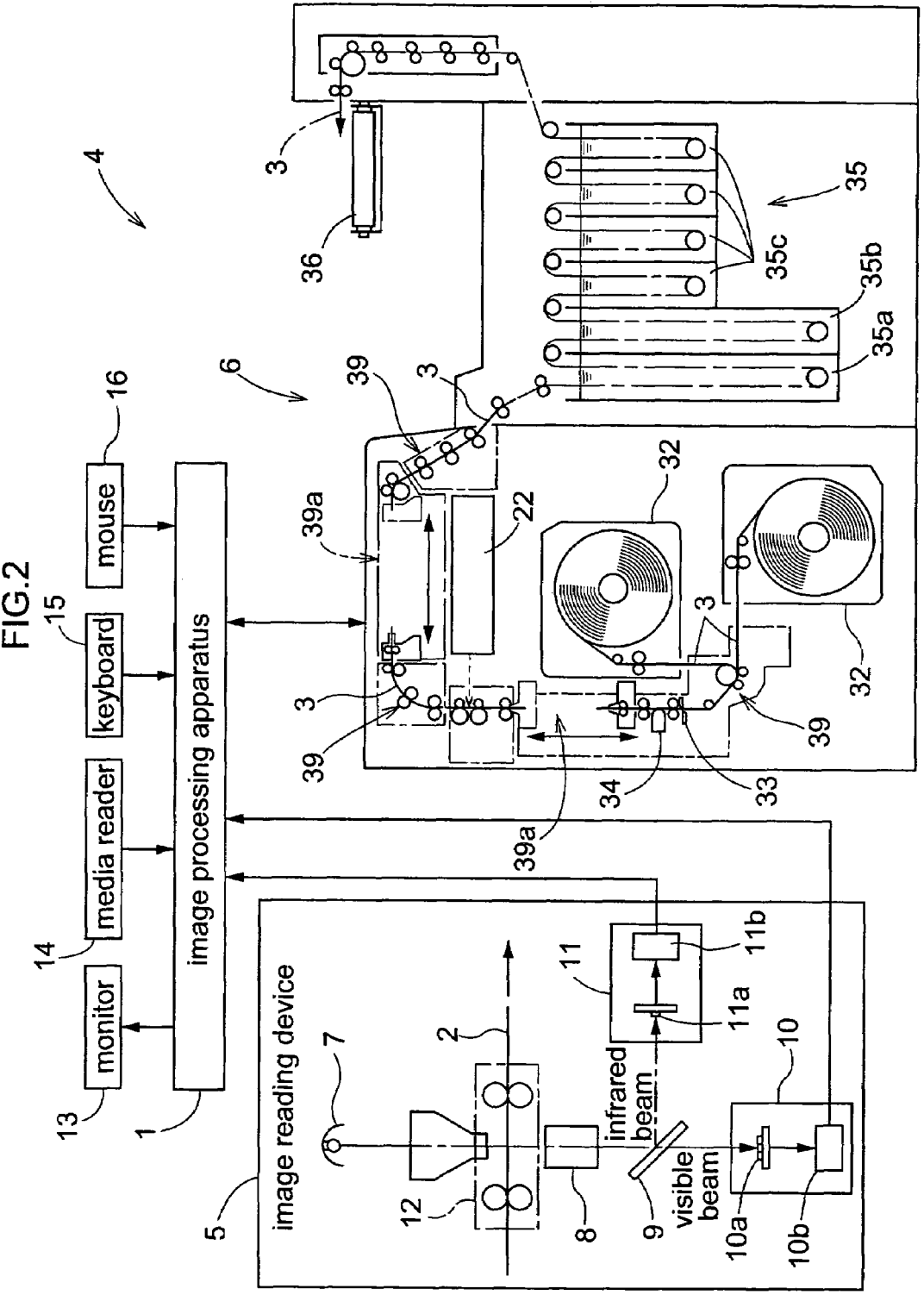
FIG. 2 is a diagram showing a schematic construction of the image printing system relating to the embodiment.
Figure 3:
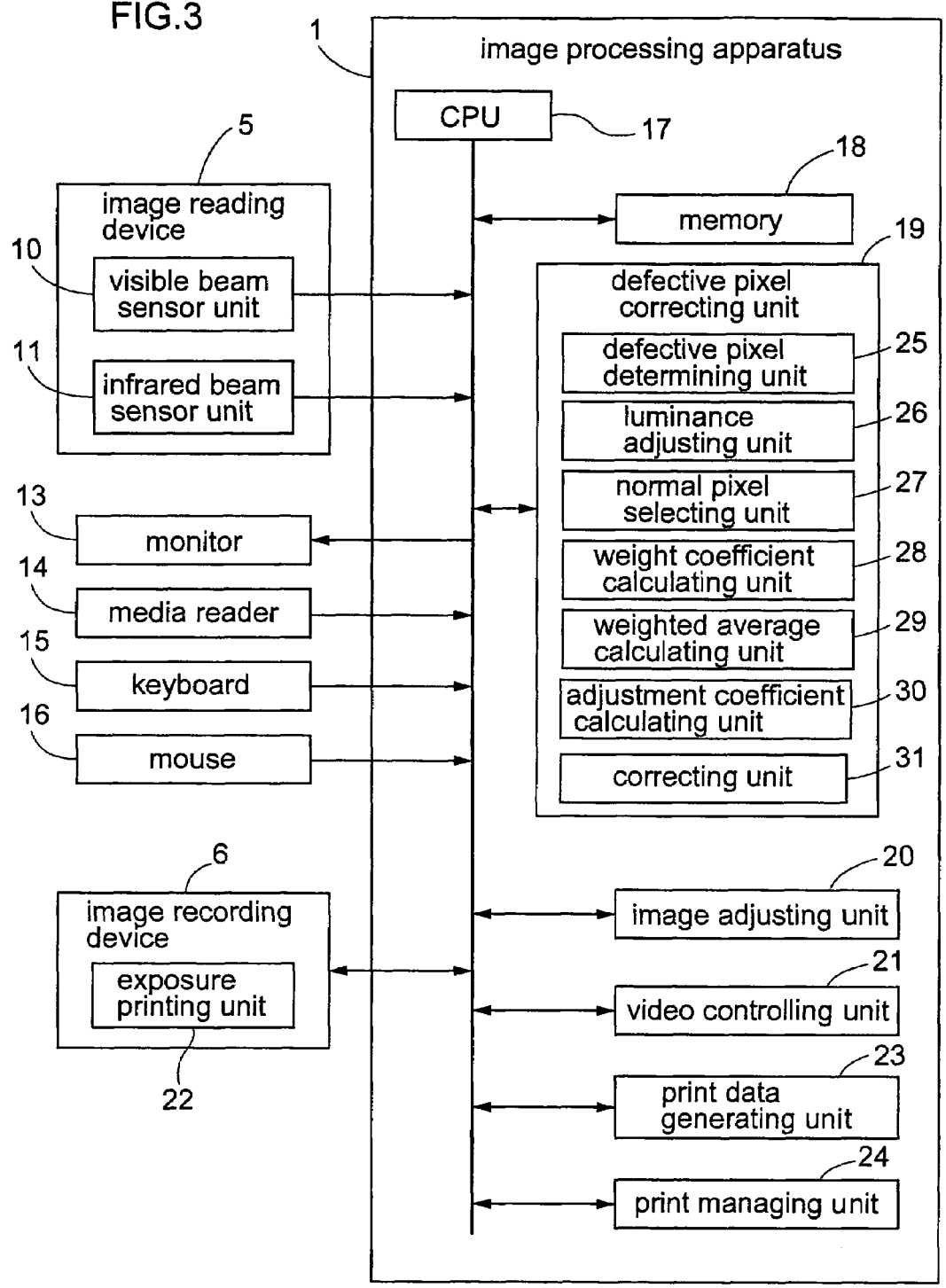
FIG. 3 is a block diagram showing various functional units of an image processing apparatus relating to the embodiment.

Next, an embodiment of the present invention will be described with reference to the accompanying drawings. In this embodiment, an image processing apparatus 1 relating to the invention is employed in an image printing system 4 adapted for reading an image from a photographic film 2 and then recording this read film image on a print paper 3. FIG. 1 is a perspective view showing an appearance of the image printing system 4 relating to this embodiment. FIG. 2 is a diagram showing a schematic construction of the image printing system 4 relating to the embodiment. FIG. 3 is a block diagram showing the various functional units of the image processing apparatus 1 relating to the invention.

As shown in these figures, this image printing system 4 includes an image reading device 5 for reading a photographically recorded image in each frame of the photographic film 2 developed by an unillustrated film developing device as digital image data, the image processing apparatus 1 configured for generating print data by effecting an image processing operation on the acquired image data, and an image recording device 6 configured for recording an image on the print paper 3 based on the print data from the image processing apparatus 1 by effecting an exposing operation and a developing operation.

The image reading device 5 is a so-called film scanner. As shown in FIG. 2, this device 5 or scanner includes, as principal components thereof, an illuminating optical unit 7, an imaging photographic unit 8 comprising e.g. a zooming lens, a dichroic mirror 9 for separating an incident beam into a visible beam and an infrared beam, a visible beam sensor unit 10, and an infrared beam sensor unit 11. The illuminating optical unit 7 includes a halogen lamp or a light-emitting diode as a light source, a mirror tunnel for modulating the light or beam from the light source, and a diffuser plate, etc. The visible beam sensor unit 10 includes three CCD arrays 10a having color filters adapted for detection of respective color components R (red), G (green) and B (blue) together constituting the visible beam image, and a visible beam signal processing circuit 10b adapted for processing respective visible beam signals acquired by these CCD arrays 10a to produce image data relating respectively to the R beam component, G beam component and B beam component and then sending these data to the image processing apparatus 1. Further, in order to detect a scar or any physical damage which may be present in the photographic film 2 as an infrared image, the infrared beam sensor unit 11 includes a CCD array 11a arranged for receiving only the infrared beam separated by the dichroic mirror 9 and an infrared signal processing circuit 11b for processing infrared signals acquired by the CCD array 11a to produce infrared image data and then sending this data to the image processing apparatus 1.

With the image reading device 5 having the above-described construction, when a photographic image recorded frame of the photographic film 2 is fixed in position at a predetermined reading position, the reading operation of this photographic image is initiated. In this, a projection image of the photographic image of the frame is read in the form of a plurality of discreet slit images by the visible beam sensor unit 10 first and then by the infrared beam sensor unit 11, through which the image is subjected to photoelectric conversions into image signals of the respective R., G, B color components and image signals of infrared components, respectively. Then, these signals are all transmitted as the digital image data to the image processing apparatus 1. The control operations by the illuminating optical unit 7, the imaging optical unit 8, the visible beam sensor unit 10 and the infrared beam sensor unit 11 to realize the above-described operations thereof are effected by the image processing apparatus 1. Hence, in the instant embodiment, a functional portion of the image processing unit 1 constitutes a constructional element of the image reading device 5.

In this embodiment, the image processing apparatus 1 comprises basically a general-purpose computer, which includes, as "peripherals" thereof, such components as a monitor 13 for displaying an operation screen of this image printing system 4, a media reader 14 for reading an image from e.g. a memory card of a digital camera, a keyboard 15 and a mouse 16 employed for allowing operator's input operations.

The image processing apparatus 1 has a CPU 17 as a principal component thereof, which includes various functional units for effecting various operations on inputted data, realized in the form of hardware and/or software. Referring those functional units particularly pertinent to the present invention, as shown in FIG. 3, a memory 18 is provided for temporarily storing the visible image data and the infrared image data for subsequent various operations thereof. A defective pixel correcting unit 19 is provided for effecting correction of a deflective pixel by using the visible image data and the infrared image data stored in the memory 18. An image adjusting unit 20 is provided for effecting various image processing operations, other than the defective pixel correction, on the visible image data mapped in the memory 18, including a color tone correction, a filtering (shading, sharpness adjustment or the like), a trimming, etc. Further, a video controlling unit 21 is provided for inputting the image data and other display items into a video memory and also converting the image mapped in the video memory into video signals by means of a video controller and then sending these video signals to the display 13. A print data generating unit 23 is provided for converting the respective final image data processed respectively by the defective pixel correcting unit 19 and the image adjusting unit 20 into the print data and then transmitting these data to an exposure printing unit 22 of the image recording device 6. A print managing unit 24 is provided for controlling the various functional units in accordance with operational instructions inputted by the operator via the keyboard 15 and the mouse 16, etc. under the operation screen created by using a graphical user interface (GUI) or operational instructions programmed in advance.

The defective pixel correcting unit 19 includes a defective pixel determining unit 25 configured for determining whether each pixel included in the visible image data is a defective pixel or not by using the infrared image data stored in the memory 18 and then creating a defective pixel map, a luminance adjusting unit 26 for effecting luminance adjustment on a pixel determined as a defective pixel by the defective pixel determining section 25, a normal pixel selecting unit 27 for selecting a "predetermined amount" of normal (non-defective) pixels from adjacent around a target pixel (pixel of interest) selected from the defective pixels, and a weight coefficient calculating unit 28 configured for obtaining a difference, for each of R, G, B components (or "RGB" hereinafter), between a pixel value of each one of the normal pixels selected by the normal pixel selecting unit 27 and a corresponding pixel value of the target pixel after its luminance adjustment by the luminance adjusting unit 26 and then using a minimum value of these differences of each normal pixel for the respective R, G, B to obtain a weight coefficient (Wgtx+i, y+j) common to the R, G, B for this normal pixel. The smaller the minimum value, the greater a weight provided by the coefficient. The defective pixel correcting unit 19 further includes a weighted average calculating unit 29 for calculating a weighted average value for the respective R, G, B for the plural normal pixels by using the weight coefficient: (Wgtx+i, y+j) calculated by the weight coefficient calculating unit 28, an adjustment coefficient calculating unit 30 for obtaining, for each of the normal pixels selected by the normal pixel selecting unit 27, a difference between a pixel value thereof for each color component and the counterpart pixel value of the target pixel obtained after the luminance adjustment, then obtaining a maximum value and a minimum value respectively from said differences obtained for the normal pixel for its respective color components, and subsequently obtaining an adjustment coefficient: (Wgt2x, y) by using a difference between said maximum value and said minimum value, and a correcting unit 31 for correcting the target pixel by applying said weighted average value: (Wgt 2x, y) for each color component calculated by said weighted-average calculating unit 30 to the counterpart pixel value of the target pixel after the luminance adjustment by a ratio corresponding to said adjustment coefficient: (Wgt 2x, y) calculated by said adjustment-coefficient calculating unit 30. Incidentally, the correction operation effected by the defective pixel correcting unit 17 on the deflect in the target pixel will be detailed later herein.

In the image recording device 6, as shown in FIG. 2, a print paper in the form of roll stored in each of two print paper magazines 32 is drawn out and then cut by a sheet cutter 33 into a print size. On a back face of this cut print paper 3, a back printing unit 34 prints various print processing information including color correction information, a serial frame number, etc. Further, the exposure printing unit 22 effects an exposure of the front face of the print paper 3 with a photographic image. Then, this exposed print paper 3 is introduced for its development to a developing tank unit 35 having a plurality of developing liquid tanks. After being dried, the print paper 3 is sent from a transverse conveyer 36 disposed at an upper portion of the recording device to a sorter 37, in which a plurality of print papers 3 are stacked on a plurality of trays 38 of this sorter 37 as being sorted out in the storage unit of customer's order (see FIG. 1).

Further, for use with this image recording device 6, there is provided a print paper transporting mechanism 39 for transporting the print paper 3 at a transporting speed suitable for each processing. The print paper transporting mechanism 39 consists essentially of a plurality of pairs of pinched-transport rollers including checker type print paper transport units 39a disposed forwardly and rearwardly of the exposure printing unit 22 relative to the transporting direction of the print paper. The exposure printing unit 22 includes line exposure heads for effecting irradiation of laser beams of three R, G, B primary colors along a main scanning direction on the print paper being transported in a sub scanning direction, based on the print data transmitted from the image recording device 6. The developing tank unit 35 includes a color development tank 35a reserving therein a color developing liquid, a bleaching-fixing tank 35b reserving therein a bleaching-fixing liquid and a stabilizing tank 35c reserving therein a stabilizing liquid.

Figure 4:
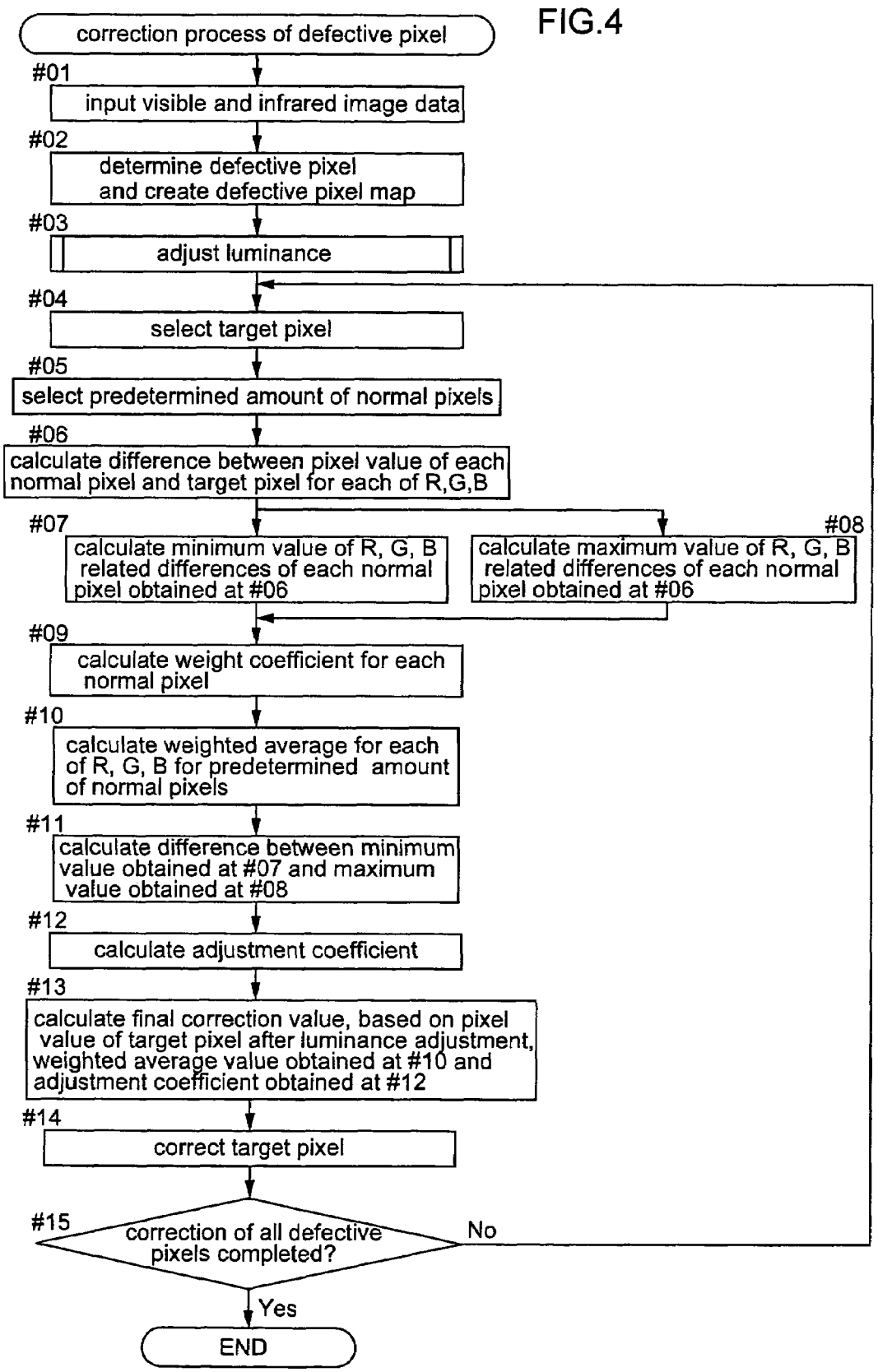
FIG. 4 is a flowchart of a correction operation of a defective pixel relating to the embodiment.

Next, the correction operation of a defective pixel relating to this embodiment will be described in details with reference to the flowchart shown in FIG. 4.

First, the visible image data and the infrared image data acquired respectively by the visible beam sensor unit 10 and the infrared beam sensor unit 11 of the image reading unit 5 are inputted to the memory (#01). Then, at the defective pixel determining unit 25, by utilizing the infrared image data stored at the memory 18 at step #01, determination is made whether each pixel included in the visible image data is a defective pixel or not and the "defective pixel map" (coordinates system) is created of a plurality of such defective pixels (#02). According to one possible mode for realizing this operation, if each pixel included in the visible image data has a pixel value below a predetermined threshold value, this pixel is determined as a defective pixel and its position (coordinates) is registered in the defective pixel map. Preferably, the "predetermined threshold value" mentioned above is set based on an average value of pixel values of all pixels included in the infrared image data.

Next, at the luminance adjusting unit 26, a luminance adjustment is effected for adjusting luminance of each pixel which was determined as a defective pixel and registered in the defective pixel map at step #02 to that of a non-deflective condition thereof (#03). According to one possible mode of luminance adjustment method employed in the above process, a difference between an average value of pixel values of all normal pixels included in the infrared image data and a pixel value of each defective pixel is interpreted and used as an amount of luminance attenuation which occurs in the pixel value due to a "damage" made in each defective pixel and this attenuation amount is added as a gain to each pixel value for the respective color components (R, G, B) of each deflective pixel included in the visible image data, whereby luminance of all defective pixels included in the visible image data are adjusted. The luminance adjustment method employed in this luminance adjustment process is not limited to the above. Any other desired luminance adjustment method can be employed, including those techniques described in the "Background Art" section herein.

Thereafter, from among those pixels which were determined as defective pixels and registered in the defective pixel map at step #02, the process selects a target pixel (pixel of interest) which is to be subjected to a correcting operation by interpolation technique (#04). This target pixel can be any one pixel which is included in the deflective pixels registered in the defective pixel map and which is not yet subjected to the correcting operation by the interpolation technique.

Figure 5:
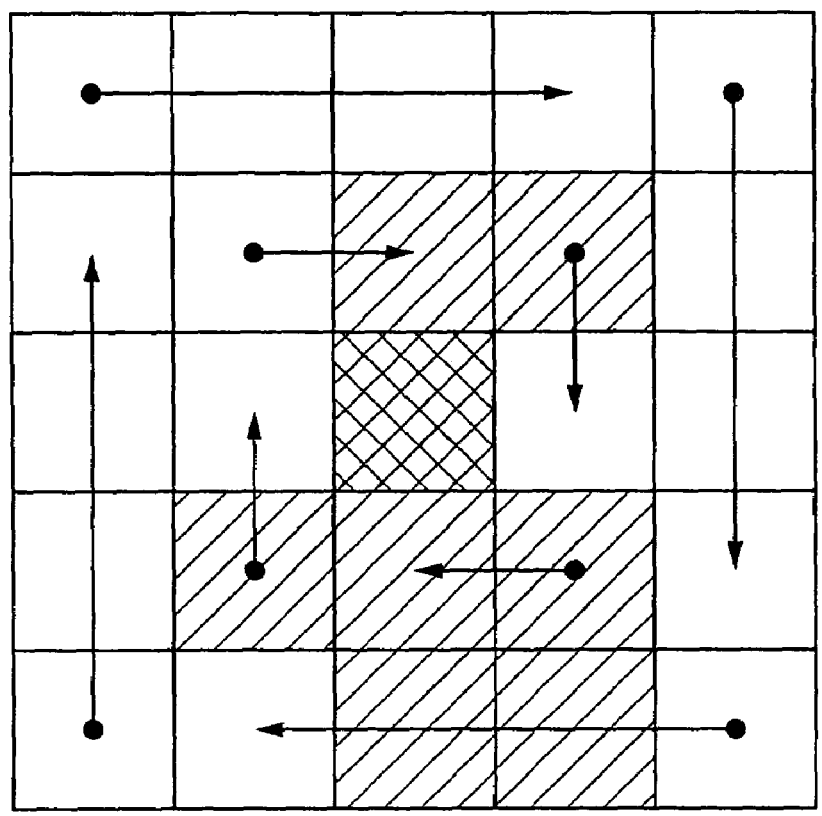
FIG. 5 is an explanatory view illustrating an exemplary method of selecting a plurality of normal (non-defective) pixels adjacent around a target pixel, in the correction process of a defective pixel relating to the embodiment.
Figure 5:
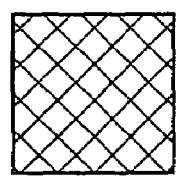
Figure 5:
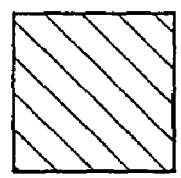
Figure 5:
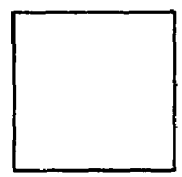

Next, at the normal pixel selecting unit 27, a predetermined amount of normal pixels are selected from adjacent around the target pixel described above (#05). One preferred mode of the method for selecting normal pixels employed in this process is to search normal pixels while progressively extending the area of search from the immediate vicinity of the target pixel, until the "predetermined amount" of normal pixels are detected. According to one exemplary search method, as illustrated in FIG. 5, first, a square area of 3×3 pixels is set around the target pixel at its center and any normal pixels are searched in four directions at one time along the respective four sides of the square. Then, until the predetermined amount of normal pixels are found, the square area of m×m pixels is progressively extended outward in the horizontal and vertical directions at one time. The method of searching normal pixels is not limited to the above. One alternative method is to extend the square search area spirally outward from the target pixel as the center.

The "predetermined amount" set for the detection of normal pixels can simply be a certain desired number of normal pixels. In this respect, as pixel values of selected normal pixels are used as a correction value for the target pixel, the greater the number of selected normal pixels, the greater the accuracy in the correction result. However, in actuality, as will be described later, as the process calculates a weighted average value of pixel values of the plural normal pixels, correction of sufficient accuracy is possible if the selected normal pixels include only from one to three normal pixels which is (are) similar to the non-defective condition of the target pixel. In addition, in general, there is high likelihood of such pixels similar to the non-defective condition of the target pixel being included in those normal pixels located adjacent around the normal pixel. For these reasons, in case the image data includes e.g. 2000×3000 pixels in total, correction of sufficient accuracy is possible if 5 to 10 normal pixels are selected. However, if a pixel value of a normal pixel located significantly away from the target cell is used for the calculation of the correction value, this will likely result in insufficiency in the accuracy in the correction result. For this reason, according to one preferred mode, for example, a square area of 15×15 pixels is set as an upper limit for the area extension. Then, if the process fails to detect the predetermined amount of normal pixels within this maximum area, the process suspends the search operation for normal pixels even when the predetermined amount has not yet been reached. And, the process employs only pixel values of those normal pixels detected so far for the calculation of the correction value. Incidentally, the setting of the "predetermined amount" used for the detection of normal pixels is not limited to the setting of the number of normal pixels. Instead, this can be set as e.g. a "quantity" of normal pixels where a sum of the weight coefficients: Wgt (x+i, y+j) calculated by the weight coefficient calculating unit 28 produces a certain predetermined value. In this case, the actual "number" of normal pixels to be searched will vary, depending on the pixel values of normal pixels to be detected.

Next, for each of the normal pixels selected at step #05, for each of R, G, B components thereof, a difference between its pixel value and the corresponding pixel value of the target pixel after the luminance adjustment by the luminance adjusting unit 26 is calculated (#06). More particularly, this calculation is made according to formulae (1), (2) and (3) below.

[formula 1]

$$Rdif(x+i,y+j)=|r1(x,y)-r2(x+i,y+j)| \quad (1)$$

$$Gdif(x+i,y+j)=|g1(x,y)-g2(x+i,y+j)| \quad (2)$$

$$Bdif(x+i,y+j)=|b1(x,y)-b2(x+i,y+j)| \quad (3)$$

where, (x, y) is the coordinates (address) of the target pixel. (i, j) represents the distance from the target pixel expressed as numbers of pixels in the x axis direction and the y axis direction respectively. Hence, a pixel located around the target pixel is expressed by the coordinates: (x+i, y+j). Further, r1, g1, b1 are pixel values of a deflective pixel for the R, G, B components thereof after the luminance adjustment. r2, g2, b2 are pixel values of a normal pixel for the R, G, B components thereof. And, R dif (x +i, y+j), G dif (x+i, y+j), B dif (x+i, y+j) are absolute values of differences between the pixel values of the normal pixel located at (x+i, y +j) and the corresponding pixel values of the target pixel after the luminance adjustment. These values are calculated for all of the normal pixels selected at step #05 (i.e., all of the normal pixels included in the searched square area of m×m pixels).

Next, the process calculates a minimum value for each normal pixel of the R, G, B related differences obtained at step #06, i.e. R dif (x+i, y+j), G dif (x+i, y+j), B dif (x+i, y+j) (#07). Specifically, this calculation is made according to formula (4) below.

[formula 2]

$$Sim(x+i,y+j)=min(Rdif(x+i,y+j),Gdif(x+i,y+j),Bdif(x+i,y+j),\alpha) \quad (4)$$

This minimum value: Sim (x+i, y+j) represents that the smaller this value, the closer the pixel value (greater similarity) of one of the R, G, B components of the normal pixel located at the coordinates (x+i, y+j) to the counterpart pixel value of the target pixel. In the above, "min" is a minimum value calculating function. And, Sim (x+i, y+j) is a minimum value of the differences for the R, G, B for the respective normal pixel obtained at step #06. This is calculated for all of the normal pixels selected at step #05. In the instant embodiment, "α" is set as an upper limit for the minimum value Sim (x+i, y+j), so that in addition to the difference for each of R, G, B, "α" is also calculated as a comparison reference by min (i.e. the minimum value calculating function). More particularly, there is possibility of similarity between the pixel value of the target pixel after the luminance adjustment and the pixel value of the normal pixel. Then, the upper limit "α" is set as a limit value at which the pixel value of such normal pixel is usable for the calculation of the correction value by the interpolation technique. Therefore, if all of the differences for the R, G, B: R dif (x+i, y+j), G dif (x+i, y+j), B dif (x+i, y+j), obtained at step #06 are greater than "α", then, as will be described later, the weight coefficient for this normal pixel located at the coordinates: (x+i, y+j) becomes "0", so that this pixel will not be employed in the calculation of the correction value by the interpolation technique. Incidentally, if e.g. each pixel has 12 bit data amount for each of R, G, B so that its pixel value can vary from 0 to 4095 and the calculation is made by using a natural logarithm of each pixel value, advantageously, the value of "α" is set as "α=1" approximately, Further, in the case of the formula (4) above, the minimum value is obtained from the difference values relating to all of the R, G, B components. Instead, it is also possible for the minimum value calculation to ignore a difference value relating to a certain color component layer which should be damaged first in the case of a scar in the emulsion layers. For example, if the respective color component layers constituting the emulsion surface of the photographic film 2 are disposed in the order of B, G, R from the outermost surface, the difference value: B dif (x+i, y+j) relating to the B component can be disregarded in the calculation of the minimum value: Sim (x+i, y+j). By disregarding a pixel value of a color component of the target pixel having higher or highest possibility of damage, hence, of inaccurate luminance adjustment in the calculation, it is possible to further improve the accuracy of the calculation.

Further, simultaneously with or in succession to the operation at step #07, for each subject normal pixel, at step #08, a maximum value is also calculated from the R, G, B related differences: R dif (x+i, y+j), G dif (x+i, y+j), B dif (x+i, y+j), obtained at step #06. More particularly, this calculation is made according to formula (5) below.

[Formula 3]

$$Adj(x+i,y+j)=max(Rdif(x+i,y+j),Gdif(x+i,y+j),Bdif(x+i,y+j)) \quad (5)$$

This maximum value: Adj (x+i, y+j) is employed in a subsequent calculation (step #11) for obtaining an adjustment coefficient: Wgt (2x, y). Here, "max" represents a maximum value calculating function. And, Adj (x+i, y+j) is a maximum value of the differences for the R, G, B components of the normal pixel located at the coordinates: (x+i, y+j) obtained at step #06. The calculation of this maximum value is effected for all of the normal pixels selected by the operation at step #05.

Incidentally, the operations at steps #06 and #07 are effected by the weight coefficient calculating unit 28. The operations at steps #06 through #08 are effected by the adjustment coefficient calculating unit 30. Therefore, these operations are effected by either one or both of the weight coefficient calculating unit 28 and the adjustment coefficient calculating unit 30.

Next, a further coefficient is calculated (#09) as a weight coefficient: Wgt (x+i, y+j) common to the R, G, B components for each normal pixel. The smaller the minimum value: Sim (x+i, y+j) obtained by the operation at step #07, the greater the weight provided by this coefficient. Specifically, this calculation is made according to formula (6) below.

[formula 4]

$$Wgt(x+i, y+j) = \frac{\alpha - Sim(x+i, y+j)}{\alpha} \quad (6)$$

This weight coefficient: Wgt (x+i, y+j) is calculated for each normal pixel. The greater a value a normal pixel has as this coefficient, the greater the effect (or influence) a pixel value of that normal pixel to be exerted on the correction value for the target pixel. Here, Wgt (x+i, y+j) is the weight coefficient obtained by the operation at step #07 for the normal pixel located at the coordinates: (x+i, y+j). And, this coefficient is calculated for all of the normal pixels selected by the operation at step #05. In this embodiment, the upper limit for Sim (x+i, y+j) is set as "a". Hence, by the calculation according to the above formula (6), the weight coefficient: Wgt (x+i, y+j) obtains a value: 0≦Wgt (x+i, y+j)≦1. If the pixel value of the target pixel after the luminance adjustment and the pixel value of the normal pixel have a same value for any one of the color components (R, G, B), the weight coefficient: Wgt (x+i, y+j) has its maximum value "1". Conversely, if the minimum value: Sim (x+i, y+j) is "α", that is to say if the pixel value of the target pixel after the luminance adjustment and the corresponding pixel value of the normal pixel have a difference therebetween greater than "α", then, the weight coefficient: Wgt (x+i, y+j) has its minimum value "0".

Thereafter, the weighted average value calculating unit 29 calculates a weighted average value for each of R, G, B for all of the normal pixels selected at #05, by using the weight coefficient: Wgt (x+i, y+j) obtained by the operation at step #09 (#10). Specifically, this operation is made according to formulae (7), (8) and (9) below.

[formula 5]

$$Rave(x, y) = \frac{\sum_{i=-n}^{n}\sum_{j=-n}^{n}(r2(x+i, y+i) \times Wgt(x+i, y+j))}{\sum_{i=-n}^{n}\sum_{j=-n}^{n}Wgt(x+i, y+j)} \quad (7)$$

$$Gave(x, y) = \frac{\sum_{i=-n}^{n}\sum_{j=-n}^{n}(g2(x+i, y+i) \times Wgt(x+i, y+j))}{\sum_{i=-n}^{n}\sum_{j=-n}^{n}Wgt(x+i, y+j)} \quad (8)$$

$$Bave(x, y) = \frac{\sum_{i=-n}^{n}\sum_{j=-n}^{n}(b2(x+i, y+i) \times Wgt(x+i, y+j))}{\sum_{i=-n}^{n}\sum_{j=-n}^{n}Wgt(x+i, y+j)} \quad (9)$$

This weighted average value: Rave (x, y), Gave (x, y), Bave (x, y) becomes the correction value for each of R, G, B for use by the interpolation operation to be applied to the target pixel. Here, "n" represents the maximum possible value for (i, j) within the square area of m×m pixels, which comprises the area in which the normal pixels were searched by the operation at step #05. Specifically, in the case of a square area of 3×3 pixels, "n" has an integer value between −1 and 1. In the case of a square area of 5 ×5 pixels, "n" has an integer value between −2 and 2. Further, as described hereinbefore, r2, g2, b2 are pixel values for R, G, B, respectively of normal pixel. Therefore, the defective pixels (including the target pixel) are not used in the operations. And, according to the above formulae (7), (8), (9), the sum of the values (products) obtained for all of the normal pixels selected at step #05 by multiplying their pixel values by the weight coefficients: Wgt (x+i, y+j) assigned respectively thereto is divided by the sum of the weight coefficients: Wgt (x+i, y+j), whereby the weighted average values: Rave (x, y), Gave (x, y), Bave (x, y) can be calculated for R, G, B respectively.

Thereafter, the adjustment coefficient calculating unit 30 calculates a difference between the maximum value: Adj (x+i, y+j) obtained at #08 and the minimum value: Sim (x+i, y+j) obtained at #07 (#11). Specifically, this calculation is made according to formula (10) below.

[Formula 6]

$$MaxMin(x+i, y+j) = Adj(x+i, y+j) - Sim(x+i, y+j) \quad (10)$$

In the above, the difference: MaxMin (x+i, y+j) between the maximum value and the minimum value is calculated for all of the normal pixels selected at #05. Based on this difference: MaxMin (x+i, y+j) between the maximum value and the minimum value, it is possible to deduce or evaluate the possibility of the defect in the defective pixel being attributable to a scar on the emulsion surface. More particularly, if this difference: MaxMin (x+i, y+j) between the maximum value and the minimum value is small, this means that the differences between the target pixel and the normal pixel located at the coordinates: (x+i, y+j) are small among the R, G, B components. Hence, in this case, it can be deduced that the attenuation amounts of the pixel values for the R, G, B components are similar to each other, hence, that the possibility of the defect in the defective pixel being attributable to a scar on the emulsion surface is low. Conversely, if this difference: MaxMin (x+i, y+j) between the maximum value and the minimum value is large, this means that the differences between the target pixel and the normal pixel located at the coordinates: (x+i, y+j) are large among the R, G, B components. Hence, in this case, it can be deduced that the attenuation amounts of the pixel values for the R, G, B components significantly differ from each other, hence, the possibility of the defect in the defective pixel being attributable to a scar on the emulsion surface is high.

Then, the adjustment coefficient calculating unit 30 calculates an adjustment coefficient: Wgt (2x, y), based on the difference: MaxMin (x+i, y+j) between the maximum value and the minimum value obtained at #11 (#12). Specifically, this calculation is made according to formula (11) below.

[formula 7]

$$Wgt2(x, y) = \frac{\sum_{i=-n}^{n}\sum_{j=-n}^{n}MaxMin(x+i, y+j)}{count \times \beta} \quad (11)$$

when $Wgt2x, y > 1$, $Wgt2x, y = 1$

This adjustment coefficient: Wgt (2x, y) is a coefficient configured for adjusting an "application ratio" of the interpolation technique, namely, a coefficient representing an application ratio showing to what extent or ratio the weighted average value: Rave (x, y), Gave (x, y), Bave (x, y) obtained at #10 should be applied to or reflected in the final correction value for the target pixel. Here, "count" represents a value of the difference: MaxMin (x+i, y+j) between the maximum value and the minimum value obtained at #11, which value is equal to the number of the normal pixels selected at #05. Further, "β" is set as a limit value of the average value: MaxMin (x+i, y+j)/count of the difference: MaxMin (x+i, y+j) between the maximum value and the minimum value obtained at #11 has when the defect in the target pixel is attributable completely (or almost certainly) to a scar in the emulsion surface. Therefore, the greater or the closer the average value: MaxMin (x+i, y+j)/count of the difference: MaxMin (x+i, y+j) between the maximum value and the minimum value to "β", the closer the value of the adjustment coefficient: Wgt (2x, y) to "1", hence the greater the application ratio of the weighted average value Rave (x, y), Gave (x, y), Bave (x, y) to the final correction value. Further, if the average value: MaxMin (x+i, y+j)/count of the difference: MaxMin (x+i, y+j) between the maximum value and the minimum value is greater than "β", it can be deduced that the defect in the defective pixel is "completely" attributable to a scar on the emulsion surface. Therefore, the adjustment coefficient: Wgt (2x, y) is set as "1", whereas the application ratio of the luminance adjustment is set as "0", so that the weighted average value: Rave (x, y), Gave (x, y), Bave (x, y) obtained at #10 becomes the final correction value directly. Incidentally, the reason why the adjustment coefficient: Wgt (2x, y) is set as "1" when the result of the calculation according to formula (11) has a value greater than "1" is that the upper limit for the adjustment coefficient: Wgt (2x, y) is set as "1" for the sake of convenience of calculation.

Next, based on the pixel value: r1 (x, y), g1 (x, y), b1 (x, y) of the target pixel after the luminance adjustment obtained at #03, the weighted average value: Rave (x, y), Gave (x, y), Bave (x, y) obtained at #10 and the adjustment coefficient: Wgt (2x, y) obtained at #12, the final correction value for the target value is calculated (#13). More particularly, by applying the weighted average value: Rave (x, y), Gave (x, y), Bave (x, y) to the pixel value: r1 (x, y), g1 (x, y), b1 (x, y) of the target pixel after the luminance adjustment obtained by an application ratio corresponding to and represented by the adjustment coefficient: Wgt (2x, y), the final correction value: Rans (x,y), Gans (x, y), Bans (x, y) for the target pixel is calculated for each of R, G, B. Specifically, this calculation is made according to formulae (12), (13) and (14) below.

[Formula 8]

$$Rans(x,y)=Rave(x,y) \times Wgt2(x,y)+r1(x,y) \times (1-Wgt2(x,y)) \quad (12)$$

$$Gans(x,y)=Gave(x,y) \times Wgt2(x,y)+g1(x,y) \times (1-Wgt2(x,y)) \quad (13)$$

$$Bans(x,y)=Bave(x,y) \times Wgt2(x,y)+b1(x,y) \times (1-Wgt2(x,y)) \quad (14)$$

According to these formulae (12), (13) and (14), the greater the value of the adjustment coefficient: Wgt (2x, y), i.e. the closer the value to "1", the possibility of the defect in the target pixel being attributable to a scar in the emulsion surface is evaluated higher. Hence, the process increases the "influence" of the weighted average value: Rave (x, y), Gave (x, y), Bave (x, y) to be exerted on the final correction value. Conversely, the smaller the value of the adjustment coefficient: Wgt (2x, y), i.e. the closer the value to "0", the possibility of the defect in the target pixel being attributable to a scar in the emulsion surface is lower. Hence, the process increases the influence of the pixel value: r1 (x, y), g1 (x, y), b1 (x, y) of the target pixel after the luminance adjustment to be exerted on the final correction value. In this manner, the final correction value for the target pixel can be calculated by applying the interpolation technique and the luminance adjustment technique by respective optimal ratios according to the evaluated possibility of the defect in the target pixel being attributable to a scar in the emulsion surface.

Then, by using the final correction value obtained at #13, the corresponding pixel value of the target pixel is corrected (#14). Specifically, this is done by substituting the pixel value: r1 (x, y), g1 (x, y), b1 (x, y) of the target pixel for the final correction value: Rasn (x, y), Gans (x, y), Bans (x, y), respectively.

Next, for all the pixels that were determined as defective pixels at #02, the process determines whether the correction process from #04 through #14 has been completed or not (#15). If not (#15: NO), the process returns to #04, to effect the same correction process on the next target pixel (next pixel of interest). When it is determined that the correction process has been completed for all the defective pixels (#15: YES), the correction process of the target pixel is ended.

OTHER EMBODIMENTS (1) In the foregoing embodiment, the defective pixel correcting unit 19 includes the adjustment coefficient calculating unit 30 to evaluate the possibility of the defect in the target pixel being attributable to a scar in the emulsion surface and then express this evaluated possibility as the adjustment coefficient. Then, depending on this possibility, the respective application ratios of the luminance adjustment and interpolation are optimally adjusted relative to each other. The image processing apparatus 1 of the invention can be constructed without such adjustment coefficient calculating unit. In this case, however, regardless of whether the defect in the target pixel is attributable to a scar in the emulsion surface or not, the weighted average value: Rave (x, y), Gave (x, y), Bave (x, y) is to become directly the final correction value for the target pixel. Therefore, in this case, the process should be provided with an additional operation in the course of the operation at #04 for the selection of the target pixel, for determining whether the defect in the target pixel is attributable to a scar in the emulsion surface or not, so that only such pixel determined as its defect being attributable to a scar in the emulsion surface may be selected as a target pixel.

(2) In the foregoing embodiment, the present invention is applied to the image printing system 4 configured for reading an image from a photographic film 2 and then recording this on a print paper 3. The application of the present invention is not limited thereto. Rather, this invention can be applied to any other type of image processing apparatus or the like, if correction is needed for a defective pixel included in color image data with irregular luminance attenuation amounts among its color components due to a certain defect therein.

The present invention may be embodied in any other manner than described above. Various modifications thereof will be apparent for those skilled in the art without departing from the essential concept thereof defined in the appended claims.

The invention claimed is:
1. An image processing method for correcting a defective portion in color image data having a plurality of color components, the method comprising the steps of:
adjusting luminance of each defective pixel;

selecting a plurality of normal pixels from around a target pixel which is selected from a plurality of defective pixels;

obtaining for each color component, a difference between a pixel value of the target pixel whose luminance has been adjusted by the luminance adjusting unit step and a corresponding pixel value of each normal pixel selected;

obtaining a minimum value of said differences for the respective color components of each normal pixel, thereby to obtain a weight coefficient common to the respective color components for said each normal pixel, the smaller the minimum value, the greater a weight being provided by said coefficient;

calculating a weighted average value for each color component of the plurality of normal pixels by using said weight coefficient; and correcting the target pixel by using said weighted average value for each color component.

2. An image processing apparatus for correcting a defective portion in color image data having a plurality of color components, the apparatus comprising:

a luminance adjusting unit for adjusting luminance of each defective pixel;

a normal pixel selecting unit for selecting a plurality of normal pixels from around a target pixel which is selected from a plurality of defective pixels;

a weight coefficient calculating unit configured for obtaining for each color component, a difference between a pixel value of the target pixel whose luminance has been adjusted by the luminance adjusting unit and a corresponding pixel value of each normal pixel selected by the normal pixel selecting unit and subsequently using a minimum value of said differences for the respective color components of each normal pixel, thereby to obtain a weight coefficient common to the respective color components for said each normal pixel, the smaller the minimum value, the greater a weight being provided by said coefficient;

an average value calculating unit configured for calculating a weighted average value for each color component of the plurality of normal pixels by using said weight coefficient calculated by said weight coefficient calculating unit; and a correcting unit for correcting the target pixel by using said weighted average value for each color component calculated by said weighted-average calculating unit.

3. The image processing apparatus according to claim 2, wherein said normal pixel selecting unit effects the search for normal pixels while progressively extending its search area outward from the vicinity of the target pixel, until a predetermined amount of normal pixels is detected.

4. The image processing apparatus according to claim 2, further comprising an adjustment coefficient calculating unit for obtaining, for each of the normal pixels selected by the normal pixel selecting unit, a difference between a pixel value thereof for each color component and the counterpart pixel value of the target pixel obtained after the luminance adjustment by the luminance adjusting unit, then obtaining a maximum value and a minimum value respectively from said differences obtained for the normal pixel for the respective color components, and subsequently obtaining an adjustment coefficient by using a difference between said maximum value and said minimum value, wherein said correcting unit corrects the target pixel by applying said weighted average value for each color component calculated by said weighted-average calculating unit to the counterpart pixel value of the target pixel after the luminance adjustment by a ratio corresponding to said adjustment coefficient calculated by said adjustment-coefficient calculating unit.

5. A computer-readable medium comprising computer-executable instructions for correcting a defective portion in color image data having a plurality of color components, said computer-executable instructions comprising the instructions for: adjusting luminance of each defective pixel;

selecting a plurality of normal pixels from around a target pixel which is selected from a plurality of defective pixels;

obtaining for each color component, a difference between a pixel value of the target pixel whose luminance has been adjusted by the luminance adjusting unit and a corresponding pixel value of each normal pixel selected;

obtaining a minimum value of said differences for the respective color components of each normal pixel, thereby to obtain a weight coefficient common to the respective color components for said each normal pixel, the smaller the minimum value, the greater a weight being provided by said coefficient;

calculating a weighted average value for each color component of the plurality of normal pixels by using said weight coefficient; and correcting the target pixel by using said weighted average value for each color component.

* * * * *